United States Patent
Okamoto

Patent Number: 6,045,933
Date of Patent: Apr. 4, 2000

[54] METHOD OF SUPPLYING FUEL GAS TO A FUEL CELL

[75] Inventor: Takafumi Okamoto, Wako, Japan

[73] Assignee: Honda Giken Kogyo Kabushiki Kaisha, Tokyo, Japan

[21] Appl. No.: 09/013,863

[22] Filed: Jan. 27, 1998

Related U.S. Application Data

[63] Continuation-in-part of application No. 08/728,962, Oct. 11, 1996, Pat. No. 5,714,276.

[30] Foreign Application Priority Data

Oct. 11, 1995 [JP] Japan ................................ 7-263340

[51] Int. Cl.$^7$ .................................................... H01M 8/06
[52] U.S. Cl. .............................................. 429/17; 429/26
[58] Field of Search ................................. 429/13, 17, 19, 429/20, 26

[56] References Cited

U.S. PATENT DOCUMENTS

| | | | |
|---|---|---|---|
| 4,746,329 | 5/1988 | Christner et al. ...................... | 429/19 X |
| 4,772,634 | 9/1988 | Fareegne .............................. | 429/17 X |
| 4,812,373 | 3/1989 | Grimble et al. ......................... | 429/19 |
| 4,847,000 | 7/1989 | Vu et al. .................................. | 252/373 |
| 4,988,580 | 1/1991 | Ohsaki et al. ............................ | 429/19 |
| 5,141,823 | 8/1992 | Wright et al. ............................ | 429/19 |
| 5,344,721 | 9/1994 | Sonai et al. ............................. | 429/20 |
| 5,604,047 | 2/1997 | Bellows et al. ........................... | 429/19 |
| 5,616,430 | 4/1997 | Aoyama ................................... | 429/17 |
| 5,741,474 | 4/1998 | Isomura et al. ........................ | 423/648.1 |

*Primary Examiner*—Maria Nuzzolillo
*Assistant Examiner*—Jonathan Crepeau
*Attorney, Agent, or Firm*—Lyon & Lyon LLP

[57] ABSTRACT

A fuel gas supply device is equipped with a reformer for conducting steam reforming of methanol which is supplied from a methanol tank, and a hydrogen gas supply means for supplying hydrogen gas only, which is contained in the fuel gas derived from the reformer, to a fuel cell. By passing the fuel gas through a hydrogen permeable membrane or a pressure-swing adsorption device, a fuel gas in which any unreacted methanol is reliably removed therefrom can be supplied to the fuel cell. According to further embodiments, unreacted methanol is caused to positively react on a fuel electrode side of a fuel cell stack, so as to remove excess amounts of unreacted methanol from a fuel chamber. The method can further include a step of controlling the humidity of the fuel gas, by either removal or supply of moisture, before the fuel gas is supplied to the fuel cell.

7 Claims, 10 Drawing Sheets

6,045,933

METHOD OF SUPPLYING FUEL GAS TO A FUEL CELL

This application is a continuation-in-part of Ser. No. 08/728,962, filed on Oct. 11, 1996, now U.S. Pat. No. 5,714,276.

BACKGROUND OF THE INVENTION

1. Field of the Invention

The present invention relates to a fuel gas supply method for supplying a fuel gas to various types of fuel cells, of which a solid polymer electrolyte type fuel cell is one example.

2. Description of the Related Art

There has been developed a fuel cell (referred to as a solid polymer electrolyte type fuel cell) which is constructed by sandwiching fuel cells, each made up of a solid polymer electrolyte membrane having an anode side electrode and a cathode side electrode disposed on opposing sides thereof, between separators in a plural stacked fashion. Such fuel cells are being put to practical use in various technical applications. In addition, alkali type fuel cell, phosphoric acid type fuel cells, molten carbonate type fuel cells, direct methanol type fuel cells and high temperature solid oxide electrolyte fuel cells are also known.

In such types of fuel cells, by supplying a hydrogen gas (fuel gas) generated by steam reforming of methanol, for example, to the anode side electrode, together with supplying an oxidant gas (air) to a cathode side electrode, the hydrogen gas becomes ionized, and flows through the electrolyte, whereby an external electrical energy can be obtained from the fuel cell.

Incidentally, when generating hydrogen gas by steam reforming of methanol as described above, the methanol is not entirely steam reformed, but rather unreacted methanol can exist and be supplied to the anode electrode under a condition in which the hydrogen gas still contains such unreacted methanol therein. When this occurs, especially with a solid polymer electrolyte type fuel cell operating at low temperatures, a problem is indicated in that the starting voltage is greatly lowered due to the influence of such unreacted methanol.

Further, the above problem is not limited to cases in which the fuel gas is generated by steam reforming of methanol, but also occurs in cases where the fuel gas is generated by oxidation of methanol with air, or by reaction of methanol with steam and air.

SUMMARY OF THE INVENTION

A principal object of the present invention is to ensure that unreacted methanol does not remain in the fuel gas supplied to an anode side electrode, thereby providing a fuel gas supply method for a fuel cell which enables its power generating performance to be effectively maintained. According to additional embodiments, a further object of the invention is to cause unreacted methanol to positively react according to chemical processes on a fuel electrode side of a fuel cell stack, so as to remove excessive amounts of unreacted methanol from fuel gas remaining in the fuel chamber that would degrade the performance of the fuel cell.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
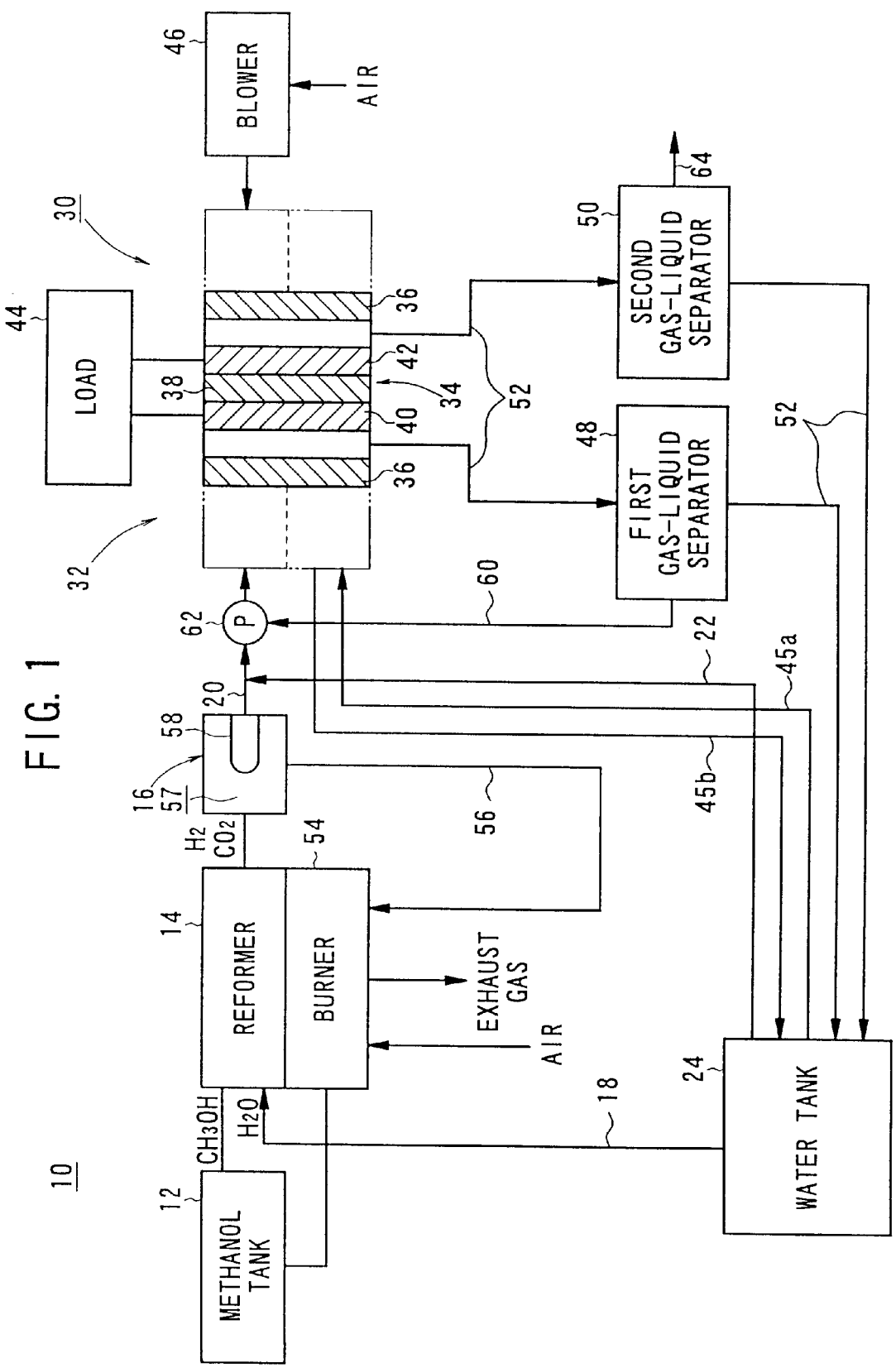
FIG. 1 is an explanatory view showing schematically the composition of a fuel gas supply device for a fuel cell according to a first embodiment of the invention.

FIG. 1 shows in schematic form the construction of a fuel gas supply device 10 for practicing the method of supplying fuel gas to a fuel cell, in accordance with the first embodiment of the present invention. The fuel gas supply device 10 is equipped with a reformer (fuel gas generating means) 14 for steam reforming methanol ($CH_3OH$) supplied from a methanol tank 12, and a hydrogen gas supply device 16 which supplies only hydrogen gas to the fuel cell 30, the hydrogen gas being contained in the fuel gas derived from the reformer 14.

A water tank 24 is connected to the reformer 14 for supplying water through a water passage 18 to the reformer 14, together with supplying water to a humidifying passage 22 for humidifying the hydrogen gas (supply gas) which is derived in the gas passage 20 from the hydrogen gas supply device 16. The fuel cell 30 supplied with humidified hydrogen gas is constructed from a plurality of layered fuel cell stacks 32, each of the fuel cell stacks 32 comprising a unit cell structural body 34, and separators 36 sandwiching therebetween the respective unit bodies 34.

Each unit cell structural body 34 includes a solid polymer electrolyte membrane 38, and a hydrogen electrode (anode side electrode) 40 and an air electrode (cathode side electrode) 42 disposed on opposing sides of the solid polymer electrolyte membrane 38 in sandwiching fashion. The hydrogen electrode 40 and air electrode 42 are connected to a load 44 such as an electrical motor. The separator 36 is formed with holes (not shown) therein for introducing hydrogen gas and air into the unit cell structural body 34, and a cooling space (not shown) which communicates with the water tank 24 through water passages 45a, 45b.

A blower 46 for introducing atmospheric air (oxidant gas), and first and second gas-liquid separators 48, 50 for separating into gas and water exhaust components discharged from the fuel cell 30, together with means for supplying the separated water to the water tank 24, are connected to the fuel cell 30. Each of the first and second gas-liquid separators 48, 50 comprises a cooling unit such as a radiator. The first and second gas-liquid separators 48, 50 and the water tank 24 communicate with each other through a passage 52.

The reformer 14 comprises a burner 54, wherein unpenetrated hydrogen, and other substances containing unreacted methanol, for example, carbon dioxide, nitrogen, water, formic acid, aldehydes such as formaldehyde, methane and fine amounts of oxygen, are introduced to the burner 54.

The hydrogen gas supply means 16 is equipped with a chamber 57 into which is introduced a fuel gas generated by the reformer 14, and a hydrogen selective permeable membrane 58 arranged inside the chamber 57 which selectively allows penetration of hydrogen gas only from the fuel gas. The hydrogen selective permeable membrane 58 is a body formed principally of palladium (Pd), and in the first embodiment is constructed from a silver-palladium (Ag-Pd) alloy film.

Unreacted hydrogen is introduced into a gas conduit 20 through a return passage 60 from the first gas-liquid separator 48 via circulation pump 62, whereas air, and as necessary, unreacted atmospheric oxygen and nitrogen and the like, are supplied to the burner 54 through a gas conduit 64 from the second gas-liquid separator 50.

Operation of the fuel gas supply device 10, constructed as described above, shall now be explained in relation to the fuel cell unit 30.

Initially, methanol is supplied to the reformer 14 from a methanol tank 12, together with water which is supplied to the reformer 14 through water passage 18 from water tank 24. Under an applied heat of the burner 54, steam reforming of methanol is conducted. Further, at a starting time, methanol is supplied to the burner 54.

Fuel gas which is generated by a methanol steam reforming reaction is supplied to the inside of a chamber 57 of the hydrogen gas supply means 16. A hydrogen selective permeable membrane made from a silver-palladium alloy film is arranged inside the chamber 57, whereby only hydrogen gas in the fuel gas which is supplied to the chamber 57 penetrates the hydrogen selective permeable membrane 58 and is delivered to the gas conduit 20. In the chamber 57, other discharge gases may exist apart from the hydrogen gas which penetrates the hydrogen selective permeable membrane 58. More specifically, there can also exist unpenetrated hydrogen gas, unreacted methanol, and other substances such as carbon dioxide, nitrogen, water, formic acid, aldehydes such as formaldehyde, methanes and fine amounts of oxygen. In the present invention such discharge gases are supplied to the burner 54 through gas conduit 56.

Hydrogen gas which is supplied to the gas conduit 20 is supplied in a humidified state to the hydrogen electrode 40 side of the fuel cell 30, by means of adding water thereto through a humidifying passage 22 from the water tank 24. On the other hand, atmospheric air (oxidant gas) is introduced to the air electrode 42 of the fuel cell 30 from blower 46, and cooling water is supplied to the separators 36 through water passages 45a, 45b from the water tank 24.

Accordingly, in the fuel cell 30, hydrogen gas extracted from the fuel gas becomes ionized (forming hydrogen ions), and flows through the solid polymer electrolyte membrane 38 toward the air electrode 42 side. Hydrogen ions react with oxygen and electrons in the air electrode 42, thereby forming water. In addition, exhaust components discharged from the hydrogen electrode 40 of the fuel cell 30 are introduced to the first gas-liquid separator 48 and are separated into unreacted hydrogen gas and water, whereas exhaust components discharged from the air electrode 42 are introduced to the second gas-liquid separator 50 and are separated into gas and water. Water collected by the first and second gas-liquid separators 48, 50 is supplied to the water tank 24 through respective water conduits 52.

Further, unreacted hydrogen gas which is separated out by the first gas-liquid separator 48 is supplied to the gas passage 20 through a return passage 60 and circulation pump 62, and delivered once again to the fuel cell 30. Unreacted oxygen and nitrogen gases separated out by the second gas-liquid separator 50, together with uncollected moisture, are discharged through gas passage 64, and further, can be introduced to the burner 54, as necessary, and used for maintaining the temperature for combustion and reformation.

In this manner, according to the first embodiment, fuel gas derived by the reformer 14 is supplied to the hydrogen gas supply means 16, whereby solely hydrogen gas in the fuel gas selectively penetrates the hydrogen selective permeable membrane 58. Therefore, an effect is attained in that undesirable substances containing unreacted methanol, which are apart from hydrogen gas in the fuel gas supplied to the hydrogen electrode, can be reliably removed, and in particular wherein lowering of the power generating performance of the fuel cell stack 32, caused by such unreacted methanol, can be effectively prevented.

Figure 2:
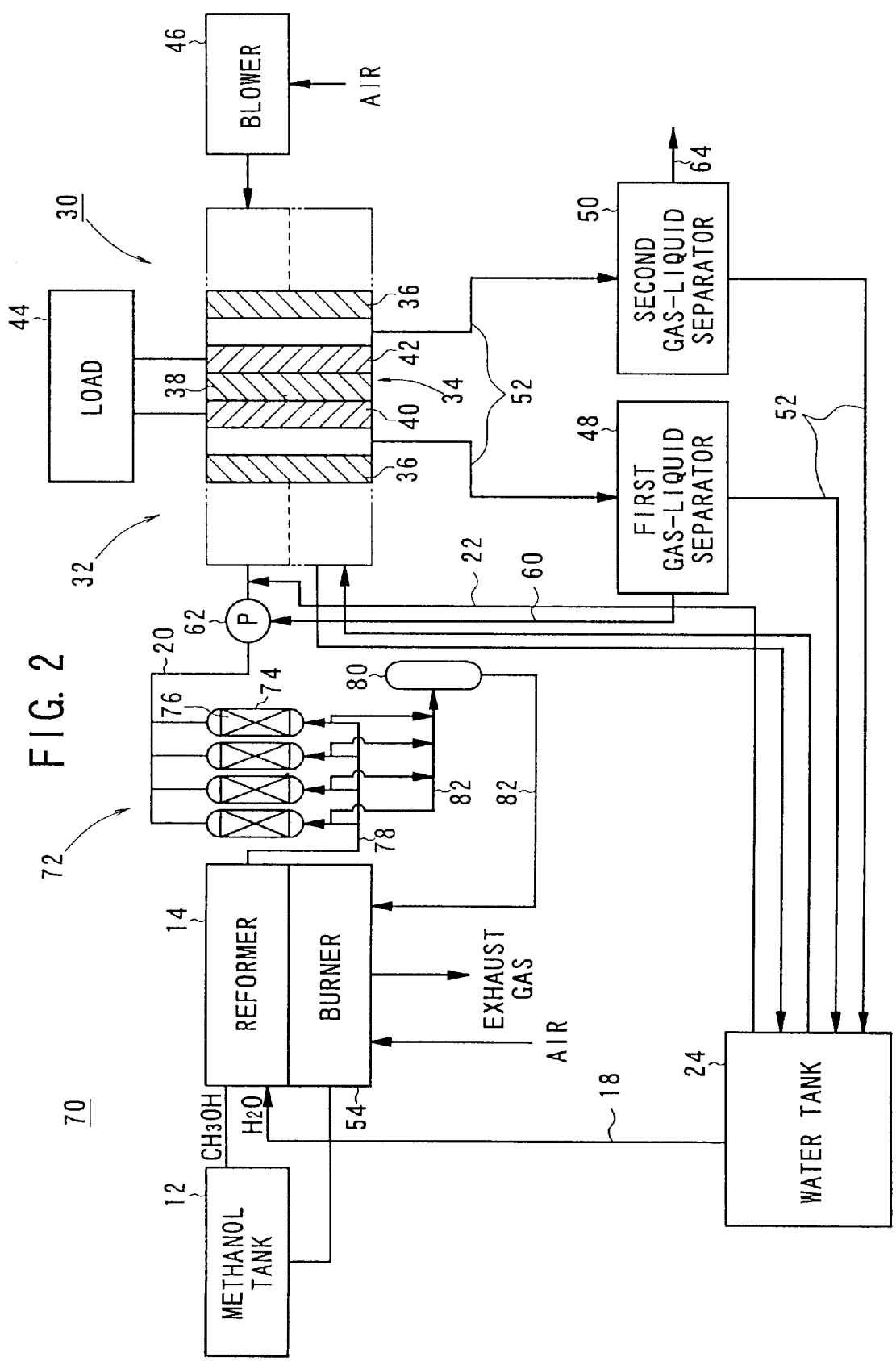
FIG. 2 is an explanatory view showing schematically the composition of a fuel gas supply device for a fuel cell according to a second embodiment of the invention.

Next, FIG. 2 shows schematically the composition of a fuel gas supply device 70, for practicing the method of supplying fuel gas to a fuel cell according to the second embodiment of the invention. Structural elements which are the same as those in the gas supply device 10 of the first embodiment are designated by like reference numerals and detailed explanation of such features shall be omitted.

The fuel gas supply device 70 comprises a PSA (Pressure Swing Adsorption) device 72 which is arranged between the reformer 14 for performing steam reforming of methanol supplied from methanol tank 12 and the fuel cell 30. The PSA device comprises plural columns 74, wherein each column 74 is filled with a gas adsorption agent 76, such as a molecular sieve.

A gas passage 78 connected to the reformer 14 diverges into plural passages corresponding to the number of columns 74, such passages connecting with the inlet sides of each respective column 74. In addition, a purge gas passage 82 is connected to the inlet sides for delivering a purge gas to a purge gas holder 80. The purge gas passage 82 is connected to burner 54, wherein gases apart from hydrogen, for example, carbon dioxide, nitrogen, steam and unreacted methanol, are supplied to the burner 54. A gas passage 20 is connected to the outlet side of the respective columns 74, whereby only hydrogen gas is supplied through the passage 20 to the fuel cell 30.

With a fuel gas supply device constructed in this manner, fuel gas generated by the reformer 14 is introduced, through gas passage 78, into respective columns 74 making up the PSA device. A gas adsorption agent is employed in columns 74, wherein by conducting adsorption and desorption actions, separation and refinement of the fuel gas is performed.

In that case, highly adsorptive components in the fuel gas are adsorbed by the gas adsorption agent, whereas hydrogen gas components which exhibit low adsorption with respect to the agent are delivered out to the gas passage 20 through column 74 outlets with high purity. In addition, as a result of the desorption action, unreacted methanol and other gases apart from hydrogen, which are adsorbed by the adsorption agent 76, for example purge gases containing carbon dioxide, nitrogen and steam, after being held once in purge gas holder 80, are then delivered to the burner 54 through purge gas passage 82.

In this manner, according to the second embodiment, fuel gas which is derived from the reformer 14 is supplied to the PSA device 72, whereby only hydrogen gas in the fuel gas flows through the inside of respective columns 74 and is supplied through gas passage 20 to the hydrogen electrode 40 making up part of the fuel cell 30. Therefore, gases apart from hydrogen gas in the fuel gas supplied to the hydrogen electrode 40 can be reliably removed, attaining the same effects as the first embodiment.

In the first and second embodiments, it has been described that a solid polymer electrolyte fuel cell is used as the fuel cell. However, the type of fuel cell employed is not necessarily limited as such, and alkali fuel cells, phosphoric acid fuel cells, molten carbonate fuel cells (MCFC), and high temperature solid oxide electrolyte fuel cells (SOFC) may also be used.

Figure 3:
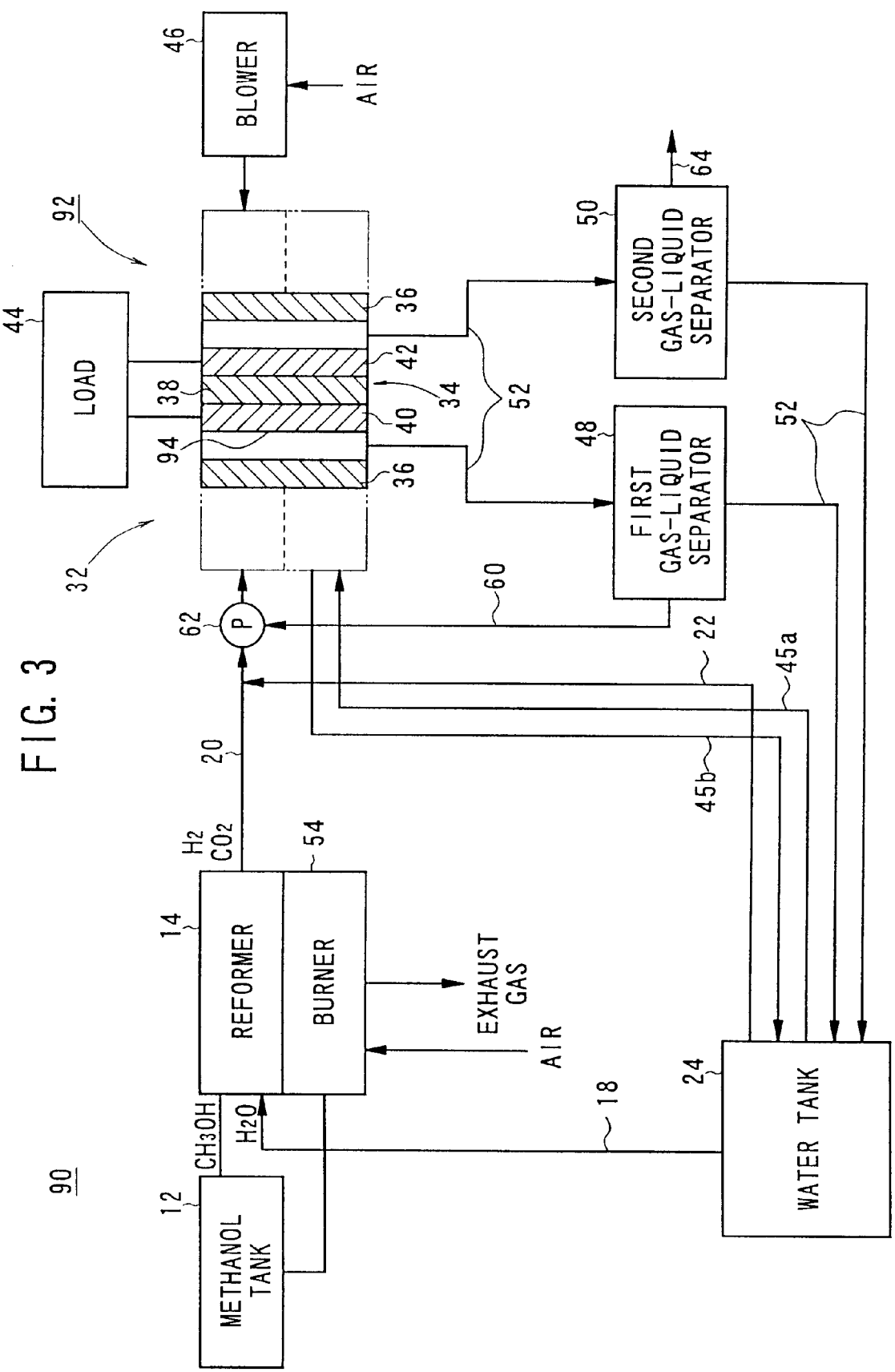
FIG. 3 is an explanatory view showing schematically the composition of a fuel gas supply device for a fuel cell according to a third embodiment of the invention.

FIG. 3 shows schematically the composition of a fuel gas supply device 90, for practicing the method of supplying fuel gas to a fuel cell according to the third embodiment of the invention. Structural elements which are the same as those in the gas supply device 10 of the first embodiment are designated by like reference numerals and detailed explanation of such features shall be omitted.

The fuel cell 92 which makes up part of the fuel gas supply device 90 comprises one of a solid polymer electrolyte fuel cell, a phosphoric acid type fuel cell, or a methanol type fuel cell. In the case of a solid polymer electrolyte fuel cell, a per-fluorosulfonic acid membrane or polybenzimidazole (PBI) membrane is used as the solid polymer electrolyte membrane 38. An electrode catalyst 94 is disposed on the hydrogen electrode 40 of the fuel cell 92, for causing a reaction with unreacted methanol. A platinum-ruthenium alloy, a platinum-ruthenium alloy to which tin or tungsten is added as a third additive metal, or a platinum-molybdenum alloy, and the like, are employed as metal catalysts.

With the fuel gas supply device 90 constructed as described above, when fuel gas generated in the reformer 14 is supplied to the fuel cell stack 32 making up the fuel cell 92, unreacted methanol contained in the fuel gas causes reactions with moisture contained in the fuel gas, and on the electrode catalyst 94 provided in the hydrogen electrode 40, as shown by equations (1) and (2).

$$CH_3OH + H_2O \rightarrow CO_2 + 3H_2 \tag{1}$$

$$H_2 \rightarrow 2H^+ + 2e \tag{2}$$

Thus, according to the third embodiment, it becomes possible that unreacted methanol contained in the fuel gas is caused to positively react on the electrode catalyst 94 of the hydrogen electrode 40 in the fuel cell 92. Accordingly, a condition in which unreacted methanol remains on the hydrogen electrode 40, and lowering of the power generating performance of the fuel cell stack results, can be reliably prevented. In particular, in a solid polymer electrolyte fuel cell, with a fuel cell employing a PBI membrane, because the operational temperature can be set high, it becomes possible for the reactions of equations (1) and (2) to progress with good efficiency.

Figure 4:
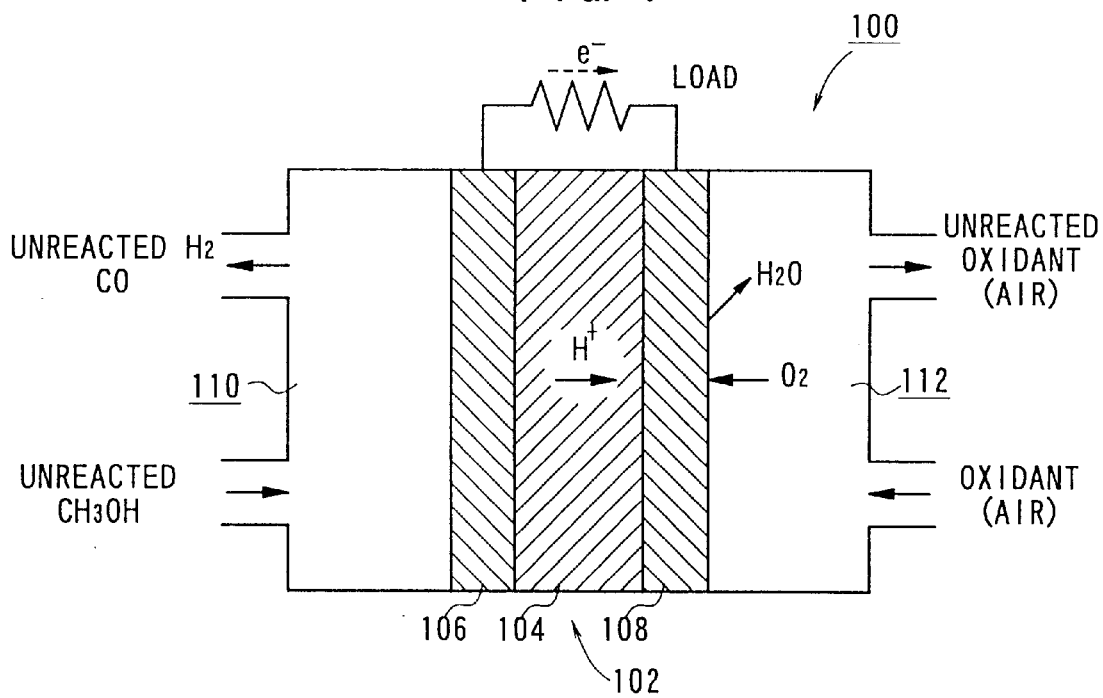
FIG. 4 is an explanatory view showing schematically the composition of a fuel cell stack which makes up the fuel gas supply device for a fuel cell according to a fourth embodiment of the invention.

FIG. 4 shows schematically the composition of a fuel cell stack 100, for practicing the method of supplying fuel gas according to the fourth embodiment of the invention. The fuel cell stack 100 makes up a high temperature solid oxide electrolyte fuel cell having disposed therein a unit cell structural body 102. The unit cell structural body 102 includes a solid oxide 104, wherein the solid oxide 104 is sandwiched between a hydrogen electrode 106 and an air electrode 108 disposed on opposing sides thereof. A fuel chamber 110 is disposed on the side of the hydrogen electrode 106, whereas an air chamber 112 is disposed on the side of the air electrode 108. The solid oxide 104 is a proton conductive body, wherein a high temperature type of electrolyte material, for example, $SrCeO_3$ is used.

Further, fuel chamber 110 and air chamber 112 are constructed to include gas passages therein defined by separator grooves, and the like, communication holes and manifolds, although such features are well understood by persons skilled in the art, and hence not illustrated in the figures.

According to the fourth embodiment, when unreacted methanol contained in the fuel gas is supplied to the fuel chamber 110 of the fuel cell stack 100, because the unit cell structural body 102 develops a comparatively high temperature on the fuel chamber 110 side, reactions shown by equations (3) and (4) are performed, whereas on the air chamber 112 side, reactions shown by equations (5) and (6) are performed.

$$CH_3 \rightarrow CO + 2H_2 \tag{3}$$

$$H_2 \rightarrow 2H^+ + 2e \tag{4}$$

$$\tfrac{1}{2}O_2 + 2e \rightarrow O^{2-} \tag{5}$$

$$2H^+ + O^{2-} \rightarrow H_2O \tag{6}$$

In this manner, because unreacted methanol in the fuel gas supplied to the fuel chamber 110 decomposes into carbon monoxide and hydrogen, unreacted methanol does not remain on the hydrogen electrode 106. Thus, the fuel cell stack 100 is not adversely influenced by unreacted methanol, resulting in the effect that power generating performance can be effectively maintained. Moreover, the generated hydrogen gas is used by the electrode reaction as a fuel gas.

Figure 5:
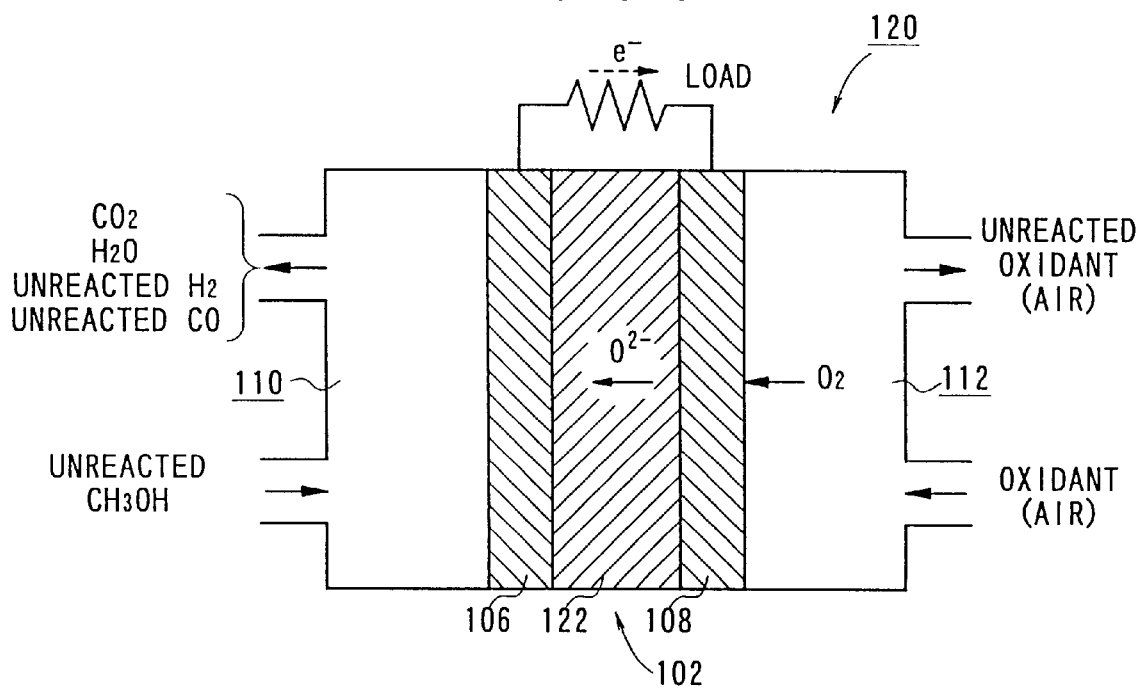
FIG. 5 is an explanatory view showing schematically the composition of a fuel cell stack which makes up the fuel gas supply device for a fuel cell according to a fifth embodiment of the invention.

FIG. 5 shows schematically the composition of a fuel cell stack 120, for practicing the method of supplying fuel gas according to the fifth embodiment of the invention. Structural elements which are the same as those in the fuel cell stack 100 shown in FIG. 4 are designated by like reference numerals and detailed explanation of such features shall be omitted.

The solid electrolyte 122 which Is constructed in the fuel cell stack 120 is an oxide ion conductive body, for example, $(Y_2O_3)x(ZrO_2)1-x$ (wherein $0.08 \leq x \text{mole } \% \leq 0.1$) may be used.

In the embodiment of FIG. 5, unreacted methanol contained in the fuel gas supplied to the fuel gas chamber 110 undergoes the decomposition reaction of equation (3) above, and further, hydrogen gas in the fuel gas undergoes the oxidation reaction shown by the following equation (7).

$$H_2+O^{2-}\rightarrow H_2O+2e \qquad (7)$$

On the other hand, in the air chamber 112, the oxygen reduction reaction shown by equation (5) is performed, and from the carbon monoxide, hydrogen gas and oxygen which are generated through decomposition of unreacted methanol, the following reaction, shown by equation (8), is performed.

$$H_2+CO+O_2\rightarrow H_2O+CO_2 \qquad (8)$$

As a result, in the fifth embodiment, unreacted methanol delivered to the fuel gas chamber 110 is subjected to heat decomposition by the unit cell structural body 102, thereby attaining the same advantageous effects as the fourth embodiment. Further, the generated hydrogen gas is used by the electrode reaction as a fuel gas.

Figure 6:
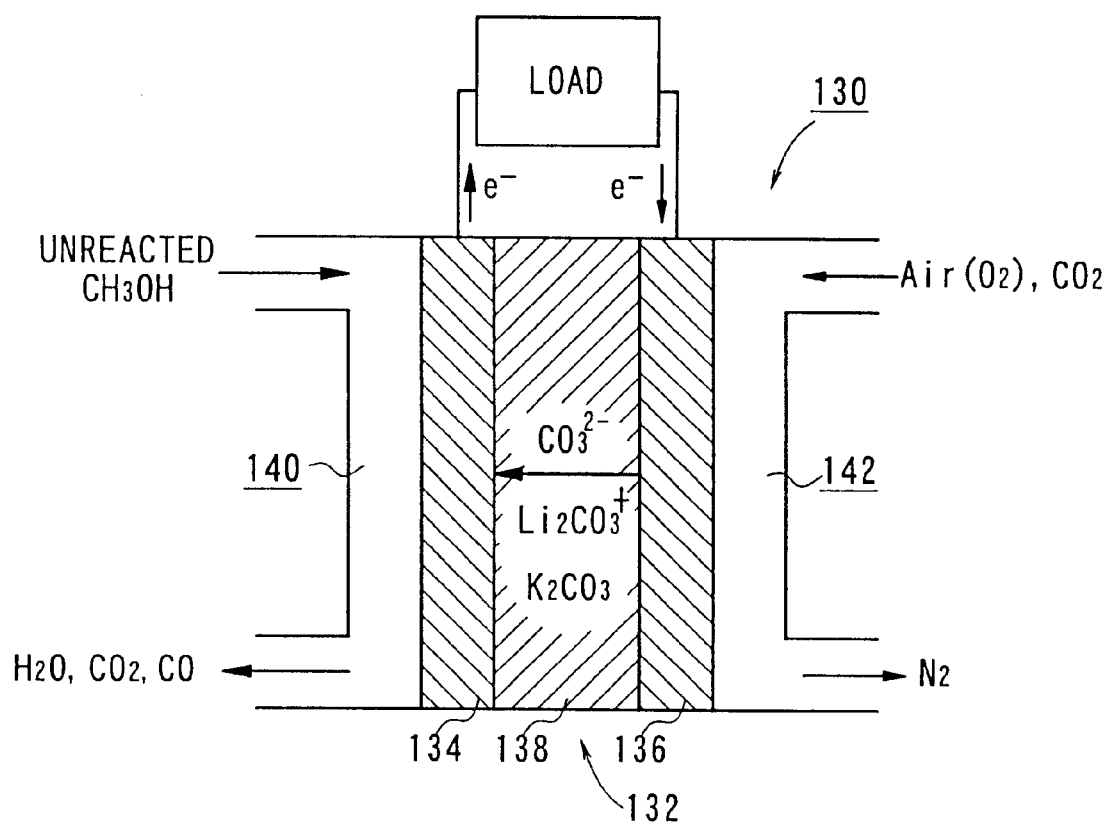
FIG. 6 is an explanatory view showing schematically the composition of a fuel cell stack which makes up the fuel gas supply device for a fuel cell according to a sixth embodiment of the invention.

FIG. 6 shows schematically the composition of a fuel cell stack 130, for practicing the method of supplying fuel gas according to the sixth embodiment of the invention.

The fuel cell stack 130 is constructed as a molten carbonate fuel cell (MCFC) type, wherein a unit cell structural body 132 disposed in the fuel cell stack 130 comprises a fuel electrode (hydrogen electrode) 134 and an air electrode 136, with an electrolyte support board 138 installed therebetween. The fuel electrode 134 is composed of porous nickel (Ni), the air electrode 136 is composed of nickel oxide (NiO), and the electrolyte support board 138 is composed of $LiAlO_2$.

In this case, according to the sixth embodiment, when fuel gas containing unreacted methanol is supplied to the fuel chamber 140 which is disposed on the fuel electrode 134 side, respective methanol decomposition and hydrogen oxidation reactions are conducted, as shown in the above equations (3) and (4). In addition, as shown by equation (9), an oxidation reduction reaction between carbonic acid ions which are transferred through the electrolyte support board 138 and hydrogen ions is performed. Accordingly, on the fuel electrode 134 side, the reaction shown by equation (10) is performed.

$$2H^{+}+CO_3^{2-}\rightarrow H_2O+CO_2 \qquad (9)$$

$$H_2+CO_3^{2-}\rightarrow H_2O+CO_2+2e \qquad (10)$$

On the other hand, when air is supplied to the air chamber 142 disposed on the air electrode 136 side, the reaction shown by equation (11) is performed in the air chamber 142.

$$CO_2+\tfrac{1}{2}\cdot O_2+2e\rightarrow CO_3^{2-} \qquad (11)$$

As a result, an MCFC reaction becomes that shown by equation (12).

$$H_2+\tfrac{1}{2}\cdot O_2\rightarrow H_2O \qquad (12)$$

In the sixth embodiment, similar to the fourth and fifth embodiments, because high temperature is developed in the fuel chamber 140, a decomposition reaction occurs on the unreacted methanol contained in the fuel gas supplied to the fuel chamber 140, with the advantage that such unreacted methanol can be effectively removed. Moreover, the generated hydrogen gas is used by the electrode reaction as a fuel gas.

Figure 7:
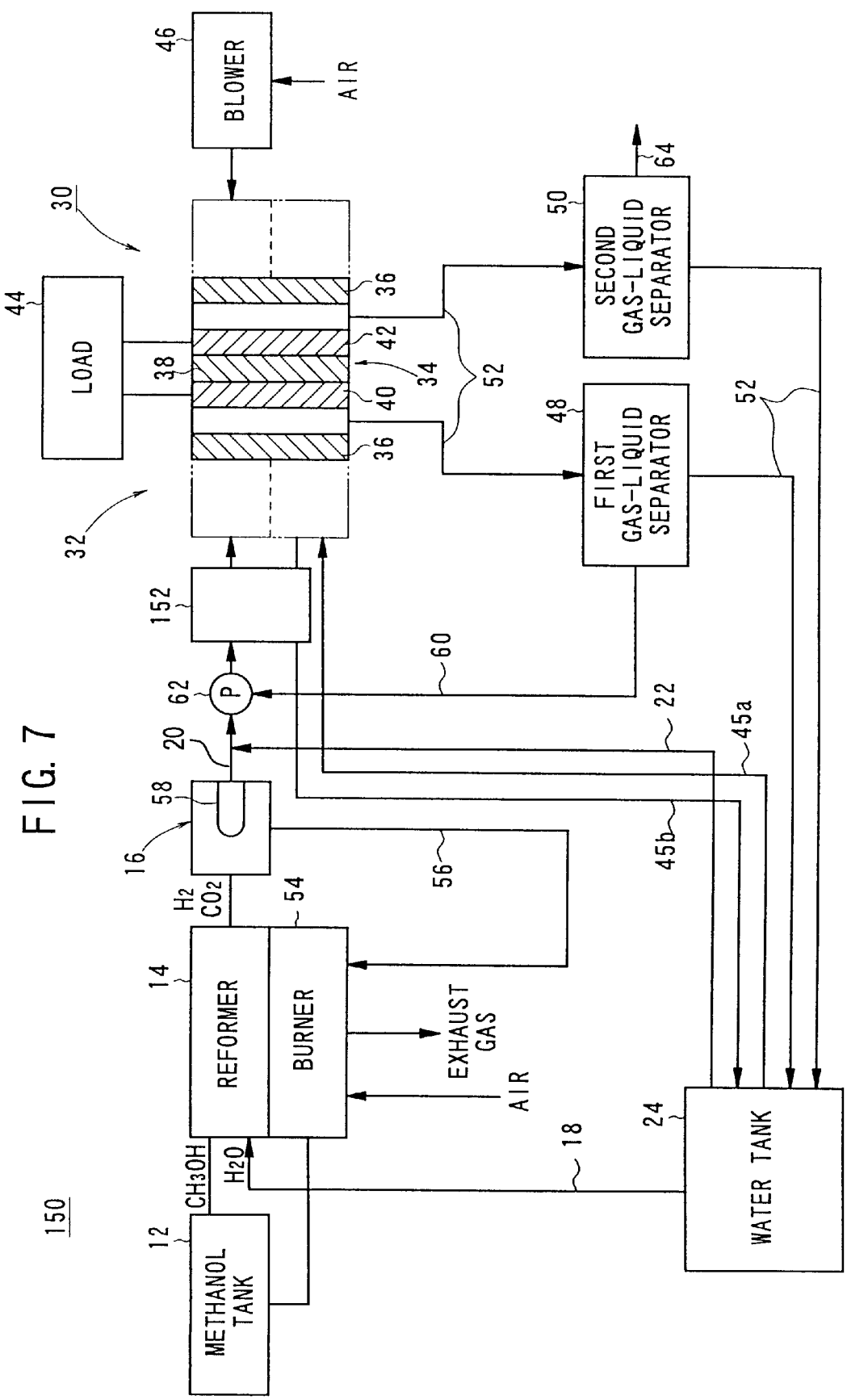
FIG. 7 is an explanatory view showing schematically the composition of a fuel cell stack which makes up the fuel gas supply device for a fuel cell according to a seventh embodiment of the invention.

FIG. 7 shows schematically the composition of a fuel gas supply device 150, for practicing the method of supplying fuel gas to a fuel cell according to the seventh embodiment of the invention. Structural elements which are the same as those in the gas supply device of the first embodiment are designated by like reference numerals and detailed explanation of such features shall be omitted.

The fuel gas supply device 150 comprises a humidity conditioning device 152 for adjusting the humidity level of the supply gas, before the supply gas (hydrogen gas), which is supplied to the gas passage 20 from the hydrogen gas supply means 16, is supplied to the fuel cell 30. The humidity conditioning device 152 comprises a heat exchange device arranged at a position on a downstream side of the circulation pump 62 in the gas passage 20.

The humidity conditioning device 152, as a result of conducting heat exchange between the supply gas and cooling water which has become heated during cooling of the fuel cell, possesses a function of conditioning the supply gas so as to contain saturated steam therein, and to have a temperature substantially the same as that of the operating temperature of the fuel cell 30.

Figure 8:
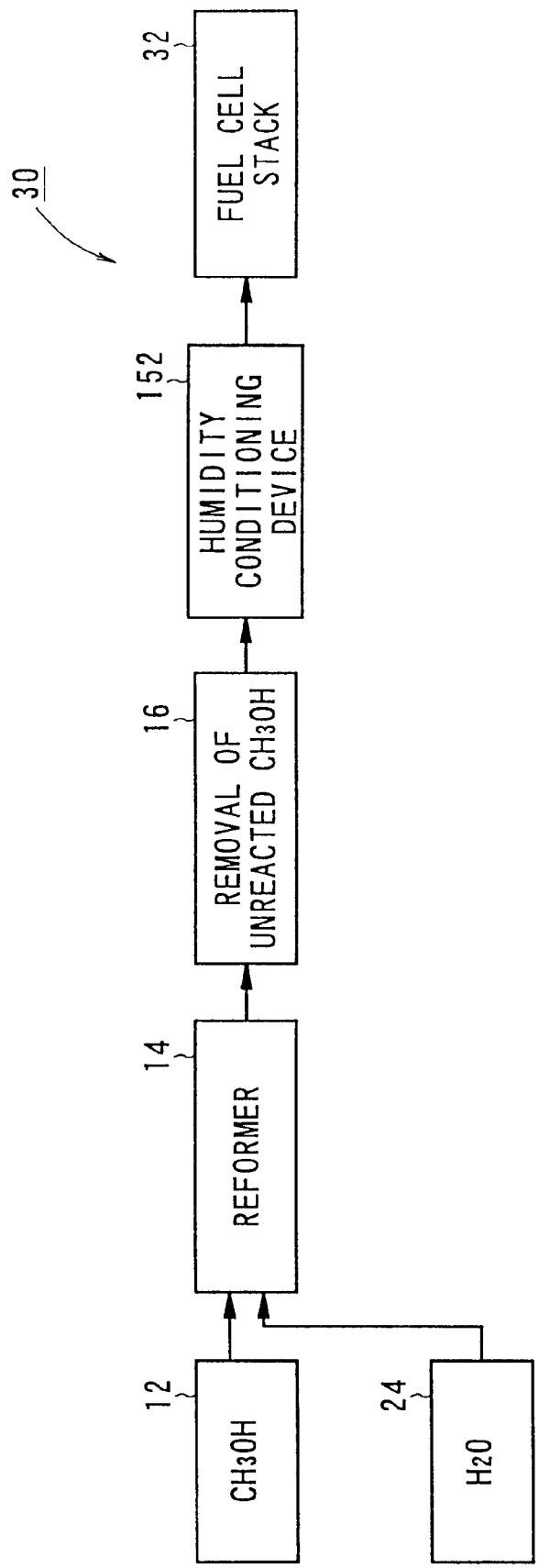
FIG. 8 is an explanatory flow-chart describing the operational process of the fuel gas supply device of the above-noted seventh embodiment of the invention.

According to the seventh embodiment, as shown in FIG. 8, first methanol and water are introduced into the reformer 14, and fuel gas subjected to steam reforming is then introduced into the hydrogen gas supply means 16, wherein other substances apart from hydrogen gas containing unreacted methanol are removed. Thereafter, hydrogen gas (supply gas) is introduced into the humidity conditioning device, the hydrogen gas developing a relatively high temperature (150° C.–250° C.) from the steam vapor. On the other hand, cooling water, which cools each fuel cell stack 32 and thereby has become heated to the operating temperature of the fuel cell 30 (60° C.–100° C.), is introduced into the humidity conditioning device 152 through water passage 45b.

As a result, the temperature of the hydrogen gas is adjusted to have a temperature in the vicinity of the operating temperature of the fuel cell stack 32, wherein the amount of steam vapor contained in the hydrogen gas becomes saturated. Accordingly, hydrogen gas containing steam vapor therein is reliably supplied to the fuel cell 30, attaining the effect that the solid polymer electrolyte membrane 38 can be optimally humidified.

Figure 9:
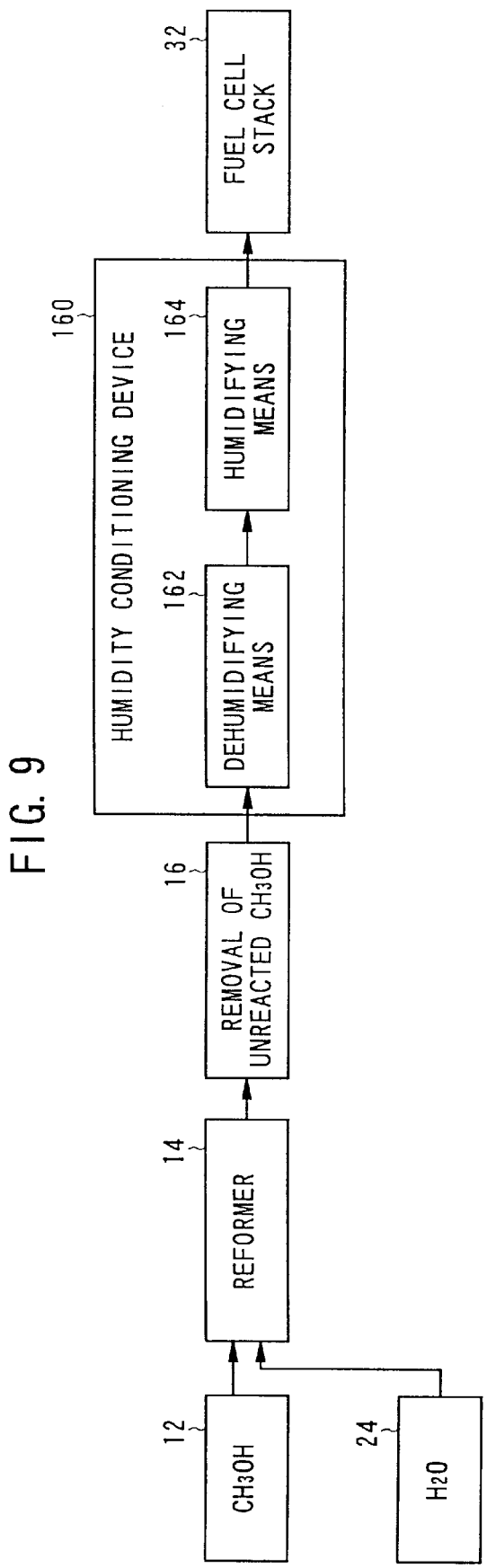
FIG. 9 is an explanatory flow-chart describing the operative state of the fuel gas supply device according to an eighth embodiment of the present invention.

FIG. 9 shows the eighth embodiment of the invention which is equipped with a humidity conditioning device 160 which differs from the humidity conditioning device 152 shown in FIG. 8. The humidity conditioning device 160 comprises a dehumidifying means 162 for removing moisture from the fuel gas when the moisture content of the fuel gas is excessive for the fuel cell stack 32, and a humidifying means 164 for adding moisture to the fuel gas when moisture in the fuel cell stack 32 is insufficient. The dehumidifying means 162 is provided as a coolant medium circuit for conducting heat exchange together with the fuel gas, whereas the humidifying means 164, similar to the humidity conditioning device 152, makes use of the cooling water which has been used for cooling the fuel cell stack 32, and can also perform humidifying by an injector, membrane humidifying device, bubbler or the like.

As a result, according to the eighth embodiment equipped with the humidity conditioning device 160, the moisture content of the hydrogen gas can be suitably adjusted corresponding to the moisture condition of the solid polymer electrolyte membrane 38, attaining an effect wherein stable operation of the fuel cell 30 can be accomplished.

Figure 10:
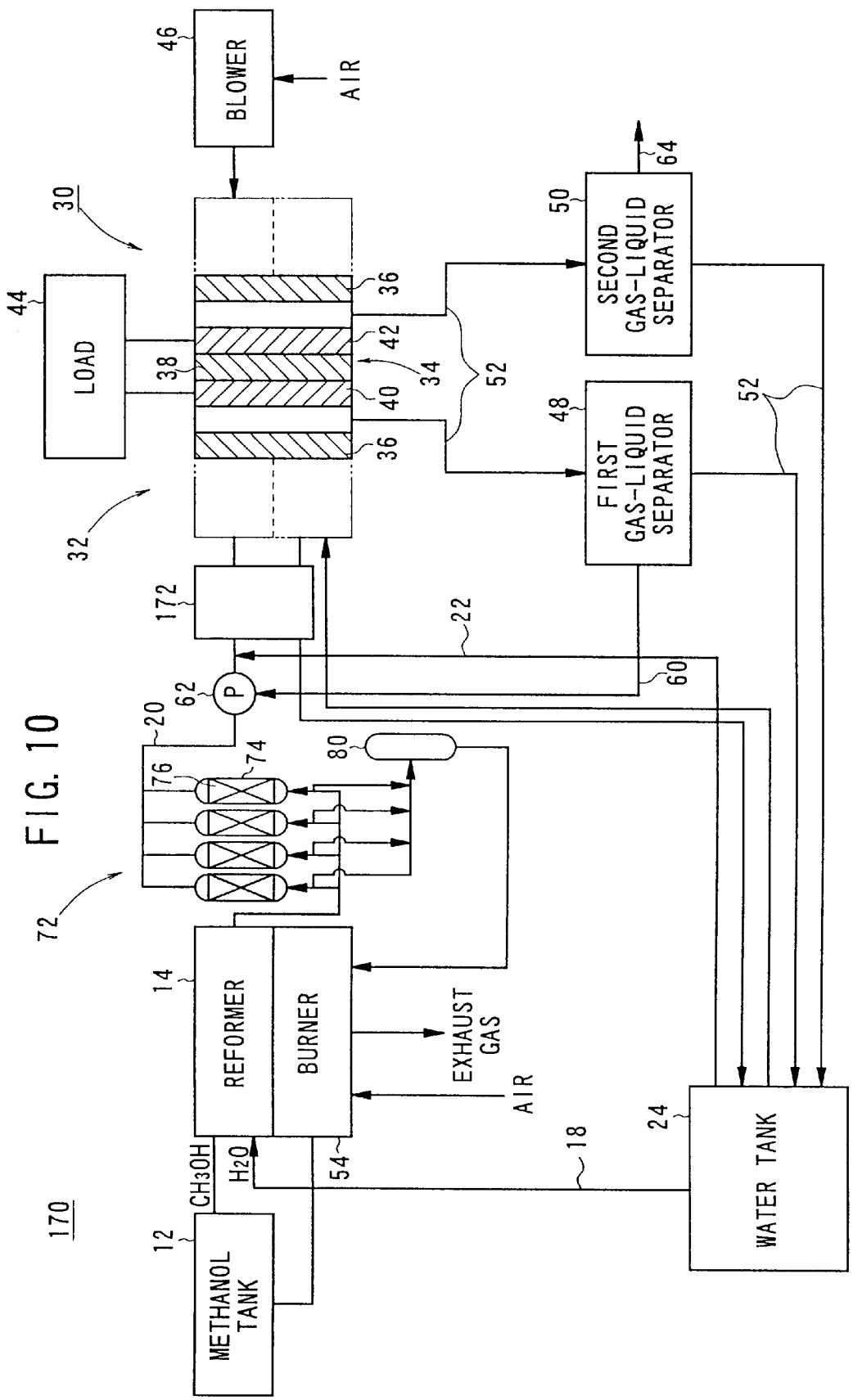
FIG. 10 is an explanatory view showing schematically the composition of a fuel gas supply device for a fuel cell according to a ninth embodiment of the invention.

FIG. 10 shows schematically the construction of a fuel gas supply device 170 for practicing the fuel gas supply method according to the ninth embodiment of the present invention. Structural elements which are the same as those in the gas supply device 70 of the second embodiment are designated by like reference numerals and detailed explanation of such features shall be omitted.

In the fuel gas supply device 170, a humidity conditioning device 172 is installed between a PSA device 72 and the fuel cell 30. The humidity conditioning device 172 is constructed in the same manner as the humidity conditioning device 152 shown by FIG. 8 or the humidity conditioning device 160 shown by FIG. 9.

Figure 11:
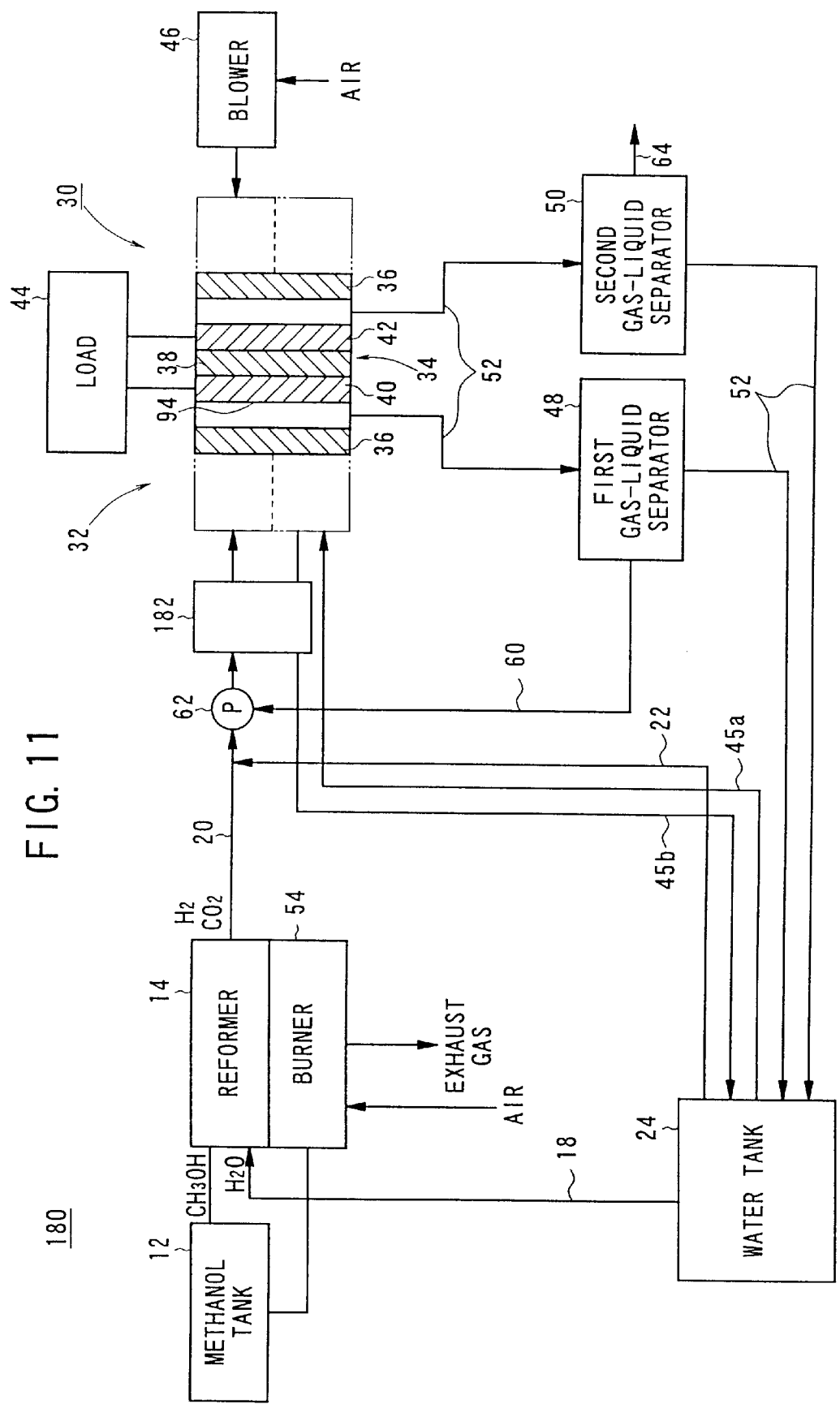
FIG. 11 is an explanatory view showing schematically the composition of a fuel gas supply device for a fuel cell according to a tenth embodiment of the invention.

FIG. 11 shows schematically the construction of a fuel gas supply device 180 for practicing the fuel gas supply method according to the tenth embodiment of the present invention. Structural elements which are the same as those in the gas supply device 90 of the third embodiment are designated by like reference numerals and detailed explanation of such features shall be omitted.

The fuel gas supply device 180 includes a humidity conditioning device 182 disposed between the reformer 14 and the fuel cell 92. The humidity conditioning device 182 is constructed in the same manner as the humidity conditioning device 152 shown by FIG. 8 or the humidity conditioning device 160 shown by FIG. 9.

In this manner, according to the ninth and tenth embodiments, moisture content in the hydrogen gas supplied to the fuel cell 30 (or 92) can be effectively adjusted, making is possible to effectively maintain operability of the fuel cell 30 (or 92).

Further, in the fourth through sixth embodiments shown in FIGS. 4–6 as well, moisture content in the fuel gas can be properly adjusted by assembling therein the respective humidity conditioning devices 152 and 160 shown in FIGS. 8 and 9.

I claim:

1. A fuel gas supply method for supplying fuel gas to a fuel cell, comprising the steps of:

generating a fuel gas from methanol in a fuel gas generating device;

forcibly reacting and removing unreacted methanol contained in the generated fuel gas on a fuel electrode side of a fuel cell stack; and supplying said fuel gas from which unreacted methanol has been removed to said fuel cell stack.

2. The fuel gas supply method according to claim 1, wherein said fuel cell is a solid polymer electrolyte fuel cell, further comprising the step of conditioning the humidity of said fuel gas before the fuel gas is supplied to said fuel cell stack.

3. The fuel gas supply method according to claim 2, wherein said step of humidity conditioning is performed via heat exchange using cooling water.

4. The fuel gas supply method according to claim 2, wherein said step of humidity conditioning further comprises the step of selectively removing moisture from said fuel gas or supplying moisture to said fuel gas, corresponding to a moisture condition in said fuel cell stack.

5. The fuel gas supply method according to claim 1, wherein said fuel cell comprises one of a solid polymer electrolyte, a phosphoric acid, and a direct methanol fuel cell, and wherein the fuel electrode making up part of said fuel cell comprises one of a platinum-ruthenium alloy electrode catalyst for reacting with said unreacted methanol, a platinum-ruthenium alloy electrode catalyst to which tin or tungsten are added as a third additive metal, and a platinum-molybdenum alloy electrode catalyst.

6. The fuel gas supply method according to claim 1, wherein said fuel cell is a solid oxide electrolyte fuel cell, further comprising the step of subjecting unreacted methanol contained in the generated fuel gas to heat decomposition in a gas chamber on the fuel electrode side making up part of said fuel cell stack, thereby removing said unreacted methanol.

7. The fuel gas supply method according to claim 1, wherein said fuel cell is a molten carbonate fuel cell, further comprising the step of subjecting unreacted methanol contained in the generated fuel gas to heat decomposition in a gas chamber on the fuel electrode side making up part of said fuel cell stack, thereby removing said unreacted methanol.

* * * * *